Feb. 26, 1957
A. FESSIA
2,782,864
PROPELLING UNIT FOR MOTOR VEHICLES WITH
INDEPENDENT SUSPENSION DRIVING WHEELS
Filed Sept. 29, 1953
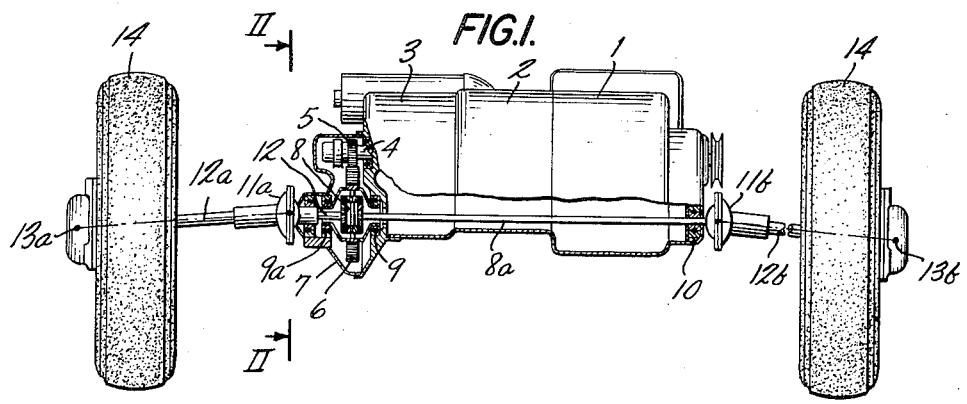
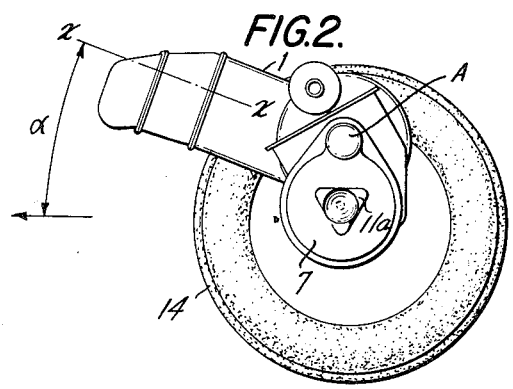
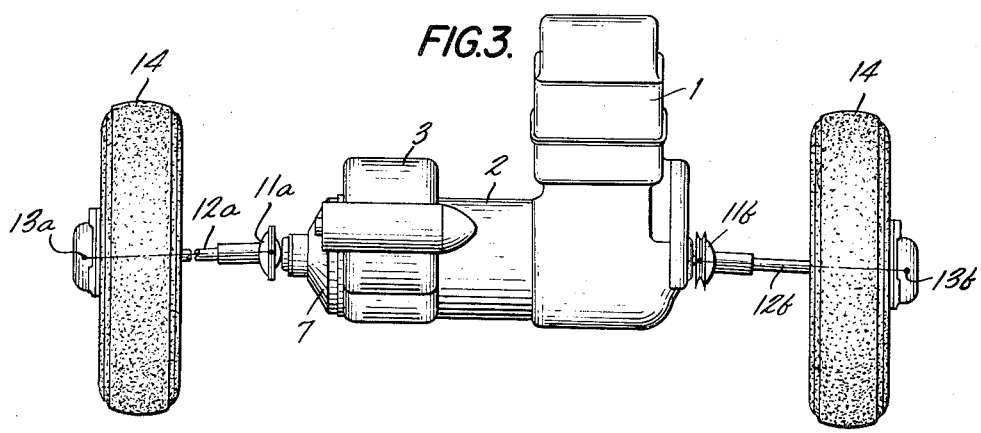

United States Patent Office 2,782,864
Patented Feb. 26, 1957

2,782,864

PROPELLING UNIT FOR MOTOR VEHICLES WITH INDEPENDENT SUSPENSION DRIVING WHEELS

Antonio Fessia, Milan, Italy, assignor to Fiat Societa per Azioni, Turin, Italy

Application September 29, 1953, Serial No. 383,018

Claims priority, application Italy November 27, 1952

3 Claims. (Cl. 180—55)

This invention relates to a propelling unit for motor vehicles with independent suspension driving wheels, comprising an engine of "in line" construction with the driving shaft extending transversely of and substantially superposed to the driving wheel axis, from which motion is transmitted to a cross shaft rotating at a reduced speed which comprises a torque bar forming a resilient member and directly driving the propeller shafts.

According to a further feature of this invention the friction clutch, speedbox and a reducing gear are arranged adjacent the engine transversely of the vehicle, the arrangement being such that at least for one gear reduction takes place from the engine shaft to the down-gear or reduced speed shaft in direct drive, that is, simply with the reduction effected by the reducing gear.

According to a preferred embodiment of this invention used in connection with a front driven vehicle, the plane of the engine cylinders is inclined towards the front vehicle portion and upwards relative to the horizontal through an angle ranging between 0 and 30°, which combines the advantages of a low centre of gravity and a location of the cylinders externally of the profile of the obstacles with respect to the wheels, more particularly when the wheels are of small diameter.

Further features of this invention will be understood from the appended specification referring to the accompanying drawing which shows diagramatically by way of example an embodiment thereof.

Figure 1 is an elevational view of the propelling unit according to this invention.

Figure 2 is a sectional view on line II—II of Figure 1 and

Figure 3 is a plan view of Figure 1.

1 denotes the engine, for instance of the "in line" type with two adjacent cylinders, the engine shaft 4 extending transversely of the vehicle substantially superposed to the axis connecting the two driving wheels.

The axes X—X of the cylinders are situated in the same plane and inclined towards the front of the vehicle through an angle α relative to the horizontal the angle not exceeding 30°.

The friction clutch 2 and speed-box or transmission 3 are arranged adjacent the engine 1 transversely of the vehicle.

The speedbox output shaft or engine driving shaft 4 carries a toothed wheel or gear 5 transmitting motion to a larger diameter toothed wheel or gear 6. Thus the two gears comprise a speed reducing gear. The reducing toothed wheel pair 5, 6 are enclosed in a casing 7.

The toothed wheel 6 is supported through the casing 8 of a conventional differential gear by the bearings 9, 9a.

The planet gears transmit motion to the propeller shaft 12a through short shaft 12 and universal 11a and through the torque bar 8a and universal 11b to the propeller shaft 12b. The bearing or bearing unit 10 is arranged in such manner that the torque bar 8a is subjected to only torque stresses.

The bar 8a thus forms a resilient member which is essential for satisfactory operation of the transmission to the front wheels.

The shafts 12a, 12b transmit motion at their outer ends over a further pair of universal joints 13a, 13b to the wheels 14.

The construction of the speedbox or change speed gear 3 is such that at least for one gear reduction takes place from the engine shaft A to the slower rotating shaft 8a when the speed change gear is in direct drive with the reduction effected only by the pair of speed reducing gears or toothed wheels 5, 6.

What I claim is:

1. A propelling unit for a motor vehicle having independently-suspended driving wheels disposed on an axis extending transversely to the longitudinal axis of the vehicle, comprising, in combination, a flat engine having cylinders having axes disposed in a common plane, an engine driven shaft extending transversely of the vehicle longitudinal axis and superposed with respect to the axis of the driving wheels, reduced speed transmission shaft means substantially coaxial with the axis of the driving wheels, means disposed adjacent one side of the vehicle and adapted for transmitting rotation from said engine driven shaft to said reduced speed shaft means, shafts for transmitting the drive from said reduced speed shaft means and last mentioned means to said driving wheels, and universal joints for connecting said reduced speed shaft means and said last mentioned means to said shafts transmitting the drive to said wheels, said reduced speed shaft means comprising a torque bar disposed transversely of the vehicle adjacent one side of the engine between said means for transmitting rotation from said engine driven shaft to said reduced speed shaft means and a universal joint disposed on the other side of the vehicle.

2. A propelling unit for a motor vehicle having independently-suspended driving wheels disposed on an axis extending transversely to the longitudinal axis of the vehicle, comprising, in combination, a flat engine having cylinders having axes disposed in a common plane, an engine driven shaft extending transversely of the vehicle longitudinal axis and superposed with respect to the axis of the driving wheels, a clutch, a change speed gear and a reducing gear disposed beside the engine and juxtaposed in a transverse direction, said reducing gear being driven by said engine driven shaft, means disposed adjacent one side of the vehicle and driven by said reducing gear, reduced speed transmission shaft means substantially coaxial with said axis of the driving wheels and driven through said means driven by said reducing gear, shafts for transmitting drive from said reduced speed transmission shaft means and last mentioned means to said driving wheels, universal joints for connecting said shafts to said reduced speed shaft means and said last mentioned means, one each of said universal joints being disposed adjacent either side of the vehicle, said reduced speed shaft means comprising a torque bar disposed adjacent one side of the engine and between said means driven by said reducing gear and a universal joint disposed adjacent the opposite side of the vehicle to which said means driven by said reducing gear is adjacent, and connections between said engine and said reducing gear through said change-speed gear being such that at least one gear reduction is effected from said engine shaft through said reducing gear to said reduced speed shaft means when said change-speed gear is in direct drive.

3. A propelling unit for a motor vehicle having independently-suspended driving wheels disposed on an axis extending transversely to the longitudinal axis of the vehicle, comprising, in combination, a flat engine having cylinders having axes disposed in a common plane, an engine driven shaft extending transversely of the vehicle longitudinal axis and superposed with respect to the axis of the driving wheels, said plane containing said cylinder axes being inclined forwardly with respect to a horizontal plane passing through the engine shaft, reduced speed transmission shaft means substantially coaxial with the axis of the driving wheels, means for transmitting rotation from said engine shaft to said reduced speed shaft means, said last mentioned means being disposed adjacent one side of the vehicle, shafts for transmitting the drive from said reduced speed shaft means to said driven wheels, and universal joints for connecting said reduced speed shaft means and last mentioned means to said shafts transmitting the drive to said wheels, one each of said universal joints being disposed adjacent either side of the vehicle, said reduced speed shaft means comprising a torque bar disposed between said means for transmitting rotation from said engine shaft to said reduced speed shaft means and a universal on the opposite side of the vehicle.

References Cited in the file of this patent

UNITED STATES PATENTS

| | | |
|---|---|---|
| 1,093,277 | Leggett | Apr. 14, 1914 |
| 1,380,097 | Fekete | May 31, 1921 |
| 1,989,446 | Ganz | Jan. 29, 1935 |
| 2,448,345 | Aronson | Aug. 31, 1948 |
| 2,536,560 | Limon | Jan. 2, 1951 |